(12) United States Patent
Mori

(10) Patent No.: US 9,980,597 B2
(45) Date of Patent: May 29, 2018

(54) BEVERAGE PREPARATION MACHINE WITH DROP COLLECTOR

(75) Inventor: Peter Mori, Walperswil (CH)

(73) Assignee: Nestec S.A., Vevey (CH)

( * ) Notice: Subject to any disclaimer, the term of this patent is extended or adjusted under 35 U.S.C. 154(b) by 881 days.

(21) Appl. No.: 13/991,342

(22) PCT Filed: Dec. 1, 2011

(86) PCT No.: PCT/EP2011/071547
§ 371 (c)(1),
(2), (4) Date: Jun. 3, 2013

(87) PCT Pub. No.: WO2012/072758
PCT Pub. Date: Jun. 7, 2012

(65) Prior Publication Data
US 2013/0247775 A1    Sep. 26, 2013

(30) Foreign Application Priority Data
Dec. 1, 2010 (EP) .................................... 10193234

(51) Int. Cl.
*A47J 31/06* (2006.01)
*A47J 31/40* (2006.01)
(Continued)

(52) U.S. Cl.
CPC ......... *A47J 31/407* (2013.01); *A47J 31/3633* (2013.01); *A47J 31/60* (2013.01)

(58) Field of Classification Search
CPC ..... B65D 85/8043; A47J 31/057; A47J 31/52; A47J 31/047; A47J 31/005; A47J 31/3614;
(Continued)

(56) References Cited

U.S. PATENT DOCUMENTS 7,097,074 B2 * 8/2006 Halliday ............. A47J 31/0673
222/325
7,703,380 B2 * 4/2010 Ryser ................... A47J 31/3633
99/295
(Continued)

FOREIGN PATENT DOCUMENTS

EP     0512470       11/1992
EP     1721553 A1 * 11/2006 .......... A47J 31/3633
(Continued)

*Primary Examiner* — Dana Ross
*Assistant Examiner* — Brandon Harvey
(74) *Attorney, Agent, or Firm* — K&L Gates LLP

(57) ABSTRACT

A machine (1) for preparing a beverage (2) comprises: —a seat (10) having at least one part (11) that is movable between a transfer position for introducing a beverage ingredient into the seat and/or removing said ingredient therefrom, and a processing position for forming said beverage from the ingredient in the seat; —an outlet (20) for dispensing said beverage upon formation in the seat; and —a drop collector (30) for collecting drops (2') from the outlet. This movable part (11) of the seat (10), the outlet (20) and the drop collector (30) are associated, in particular connected, so that the drop collector and the outlet are relatively moved into: —a drop collection configuration for the drop collector to collect drops (2') from the outlet when the movable part of the seat is in the transfer position; and/or —a dispensing configuration for dispensing the formed beverage (2) from the outlet into a dispensing zone (25), in particular a zone arranged for receiving a recipient such as a cup or a mug, when the movable part of the seat is in the processing position.

19 Claims, 3 Drawing Sheets

(51) Int. Cl.
*A47J 31/36* (2006.01)
*A47J 31/60* (2006.01)

(58) Field of Classification Search
CPC ....... A47J 31/56; A47J 31/0576; A23G 9/045; A47G 19/14
USPC ......... 99/295, 300, 275, 317, 280, 281, 279, 99/302 P, 282, 304, 315
See application file for complete search history.

(56) References Cited

U.S. PATENT DOCUMENTS

| | | | |
|---|---|---|---|
| 7,997,187 B2* | 8/2011 | Garman | A47J 31/0573 99/304 |
| 2003/0201337 A1* | 10/2003 | Carhuff | B67D 1/07 239/120 |
| 2007/0209521 A1* | 9/2007 | Boussemart | A47J 31/061 99/275 |
| 2008/0250936 A1* | 10/2008 | Cortese | A47J 31/0668 99/295 |

FOREIGN PATENT DOCUMENTS

| | | | | |
|---|---|---|---|---|
| EP | 1859713 A1 * | 11/2007 | .......... | A47J 31/3633 |
| EP | 2633789 A1 * | 9/2013 | .......... | A47J 31/3633 |
| FR | 2929090 | 10/2009 | | |
| WO | WO2005004683 | 1/2005 | | |
| WO | WO 2005004683 A1 * | 1/2005 | .......... | A47J 31/3633 |
| WO | WO2006050769 | 5/2006 | | |
| WO | WO 2006050769 A2 * | 5/2006 | ............ | A47J 31/061 |
| WO | WO 2008154805 A1 * | 12/2008 | .......... | A47J 31/3633 |
| WO | WO2009115474 | 9/2009 | | |
| WO | WO 2009115474 A1 * | 9/2009 | .......... | A47J 31/0668 |

* cited by examiner

BEVERAGE PREPARATION MACHINE WITH DROP COLLECTOR

CROSS REFERENCE TO RELATED APPLICATIONS

The present application is a National Stage of International Application No. PCT/EP2011/071547, filed on Dec. 1, 2011, which claims priority to European Patent Application No. 10193234.1, filed Dec. 1, 2010, the entire contents of which are being incorporated herein by reference.

FIELD OF THE INVENTION

The field of the invention pertains to beverage preparation machines, in particular using capsules of an ingredient of the beverage to be prepared, having an outlet for dispensing the beverage to a user-recipient in a dispensing zone and an arrangement for preventing undesired dripping of liquid from such an outlet into the dispensing zone, in particular between beverage dispensing processes.

For the purpose of the present description, a "beverage" is meant to include any human-consumable liquid substance, such as tea, coffee, hot or cold chocolate, milk, soup, baby food, etc. . . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Certain beverage preparation machines use capsules containing ingredients to be extracted or to be dissolved; for other machines, the ingredients are stored and dosed automatically in the machine or else are added at the time of preparation of the drink.

Most beverage machines possess within a housing: filling means that include a pump for liquid, usually water, which pumps the liquid from a source of water that is cold or indeed heated through heating means, such as a heating resistor, a thermoblock or the like, a brewing unit in which an ingredient is brewed with water or a mixing unit in which ingredients are mixed together, and a beverage outlet for dispensing the prepared beverage. Typically, the beverage outlet is located above a beverage dispensing zone, e.g. above a grid for supporting a cup or other recipient under the outlet and for the passage of drops of liquid from the beverage outlet or other spills into a collector tray located under the grid.

For example, EP 1 440 639 discloses a beverage machine comprising a receptacle stand having a hollow interior forming a drip tray. An upper surface of the receptacle stand is provided with a grill on which the receptacle is positioned. The drip tray is removable from the housing to ease emptying of the collected water. Drip tray devices with cup supports are well known in the art. There are also such devices that are further arranged for allowing the adjustment of the vertical position under the beverage outlet of cups of different sizes. Examples of arrangements in this field are disclosed in CA 2,260,352, EP 0 549 887, EP 1 731 065, EP 1 867 260, FR 2 439 042, U.S. Pat. No. 5,161,455, U.S. Pat. No. 5,353,692, WO 2009/074557.

WO 2006/050769 discloses a beverage preparation machine with a vertically movable cup support located under the machine's beverage outlet and a drop collector arm that is pivotable under the beverage outlet for collecting drops upon beverage dispensing.

SUMMARY OF THE INVENTION

The invention relates to a machine for dispensing a beverage. For instance, the machine is a coffee, tea, chocolate, cacao, milk or soup preparation machine. In particular, the machine is arranged for preparing within a beverage preparation module a beverage by passing hot or cold water or another liquid through a capsule containing an ingredient, such as a flavouring and/or nutritional ingredient, of the beverage to be prepared, such as ground coffee or tea or chocolate or cacao or milk powder.

The machine of the invention includes:
 an ingredient seat having at least one part that is movable between a transfer position for introducing a beverage ingredient into the seat and/or removing said ingredient therefrom, and a processing position for forming the beverage from the ingredient in the seat;
 an outlet for dispensing this beverage upon formation in the seat; and
 a drop collector for collecting drops from the outlet.

Such formation of a beverage typically includes the mixing of a plurality of beverage ingredients, e.g. water and milk powder, and/or the infusion of a beverage ingredient, such as an infusion of ground coffee or tea with water. Typically, a predetermined amount of beverage is formed and dispensed on user-request corresponding to a serving. Such serving may be in the range of 25 to 200 ml, e.g. the volume for filling a cup or mug, depending on the type of beverage. Formed and dispensed beverages may be selected from ristrettos, espressos, lungos, cappuccinos, café latte, americano coffees, teas, etc. . . . .

After or between beverage servings, residual liquids, e.g. beverage, may drip from the outlet typically in the form of drops. Such liquids into the beverage dispensing zone may lead to spills and are generally undesirable.

Therefore, in accordance with the invention, the movable part of the seat, the outlet and the drop collector are associated, in particular connected, so that the drop collector and the outlet are relatively moved into:
 a drop collection configuration for the drop collector to collect drops from the outlet when the movable part of the seat is in the transfer position; and/or
 a dispensing configuration for dispensing the formed beverage from the outlet into a dispensing zone, in particular a zone arranged for receiving a recipient such as a cup or a mug, when the movable part of the seat is in the processing position.

Hence, movements of the ingredient seat, e.g. a brewing unit, can be used so as to avoid that drops draining along the beverage outlet of the beverage machine are guided after the end of beverage preparation and dispensing, e.g. after a beverage serving, into the machine's dispensing zone. Instead, these drops can be guided into a waste collection arrangement.

The dispensing zone typically includes a support surface for positioning a user-recipient, e.g. a mug or a cup, to collect the dispensed beverage. The support surface may include a support member that is part of the machine or may be a virtual surface, e.g. the surface of a table on which the machine is placed. Examples of such support surfaces for user-recipients are disclosed in EP 1 867 260 and in WO 2009/074557.

Hence, the machine of the invention includes an arrangement to prevent dripping onto the dispensing zone upon a beverage formation and dispensing (e.g. upon a serving or between servings). In other words, once the process of forming and dispensing the user-requested beverage is over and the movable part of the seat is brought back into its transfer position, e.g. to insert a new ingredient into the seat and/or evacuate the used ingredient from the seat, the outlet of the machine is automatically prevented from dripping on the dispensing zone, e.g. drops of residual beverage and/or ingredients thereof. This improves the cleanness and ergonomics of the use of the machine.

Moreover, when the machine is of the type in which the above movable part of the seat is arranged to move with the outlet between the transfer and processing positions over the dispensing zone—typically a movable front part of the seat fixed to the machine's outlet as for example disclosed in WO 2009/043630—in such a case, moving the front part of the seat with the outlet into the transfer position does not involve dripping of the outlet over the dispensing zone. This can be particularly advantageous when the movable part of the seat is brought into the transfer position while a user-recipient, e.g. a cup or mug, is still positioned in the dispensing area: the dripping of liquid from the outlet moving over the dispensing area from above the mouth of the user-recipient over the upright wall(s) of the recipient, and the resulting spills on the recipient wall(s), can be efficiently prevented.

The above movable part of the seat can be mechanically fixed to the outlet or integral therewith, the outlet being movable with the movable part of the seat relative to the drop collector.

The beverage preparation machine may include a beverage guide for guiding in the dispensing configuration the beverage from the outlet onto the dispensing zone. The beverage guide is typically downstream the outlet.

The beverage guide may be movable relative to the outlet between a rest position and a reception position for receiving beverage from the outlet and guiding said beverage onto said dispensing area. The rest position may generally correspond to the above drop collection configuration and/or the reception position may generally correspond to the above dispensing configuration.

The beverage guide may be fixed to the drop collector or integral therewith. The possibility of having a machine with a beverage guide independent from the drop collector or without beverage guide downstream the outlet is also contemplated.

The outlet can be relatively movable between the drop collector and the beverage guide for draining liquid from the outlet into the drop collector in the collection position and the beverage guide in the dispensing position, respectively.

Typically, the machine includes a waste collector, such as a waste material tank or reservoir. Examples of such collectors are disclosed in EP 1 867 260, WO 2009/074557, WO 2009/074559 and WO 2009/135869.

Typically, the waste collector is configured for collecting at least one of: one or more waste beverage ingredients, such as a used flavouring ingredient and/or waste water; one or more used capsules for supplying a beverage ingredient into said machine; and a cleaning agent, such as a cleaning, rinsing or descaling liquid.

The drop collector may be arranged for evacuating liquid therefrom into the waste collector.

Usually, the machine has a housing. The drop collector may be fixed to and/or may be part of the housing. For instance, this part of the housing is part of a part of an outermost machine housing. Such housing, of which the drop collector is part or to which the drop collector is fixed, covers the seat in the processing position.

The seat may include a further part that cooperates with the movable part of the seat for forming therewith an ingredient chamber in the processing position. Examples of such ingredient seats are disclosed in WO 2007/135135 and WO 2009/043630 and in the references cited therein.

This further part of the seat can be directly or indirectly fixed to the drop collector or integral therewith. In particular, this part of the seat may be stationary in the machine's housing.

This further part of the seat may include a hydraulic sealing piston for sealing the further part against the movable part, for instance as disclosed in EP 09 172 187.

As mentioned above, the ingredient seat can be configured to house a capsule containing the beverage ingredient, such as ground coffee, instant coffee, tea leaves, cacao and/or milk powder. The seat may have at least one capsule opener, such as at least one of: one or more puncturing and/or tearing elements; and one or more pins and/or blades.

The movable part of the seat may delimit one or more passages for beverage to flow from the seat to the outlet. For instance, such passages are in the form of through-holes extending through the movable part.

In one embodiment, the machine may include an actuator, e.g. motor, for moving the movable part of the seat from the processing position to the transfer position automatically at the end of a beverage formation. The actuator may also be used to move the movable part from the transfer position to the processing position. Examples of such actuators are described in EP 1 767 129. The U.S. counterpart (U.S. Pat. No. 8,272,319) of this EP document is incorporated herein by reference in its entirety.

At the end of a beverage dispensing residual dripping is strongest. Such dripping reduces with a pressure release in the ingredient seat. A motorized reopening of the seat at the end of a beverage dispensing reduces the pressure at an early stage and residual beverage drops are handled via the drop collector.

DETAILED DESCRIPTION

Figure 1:
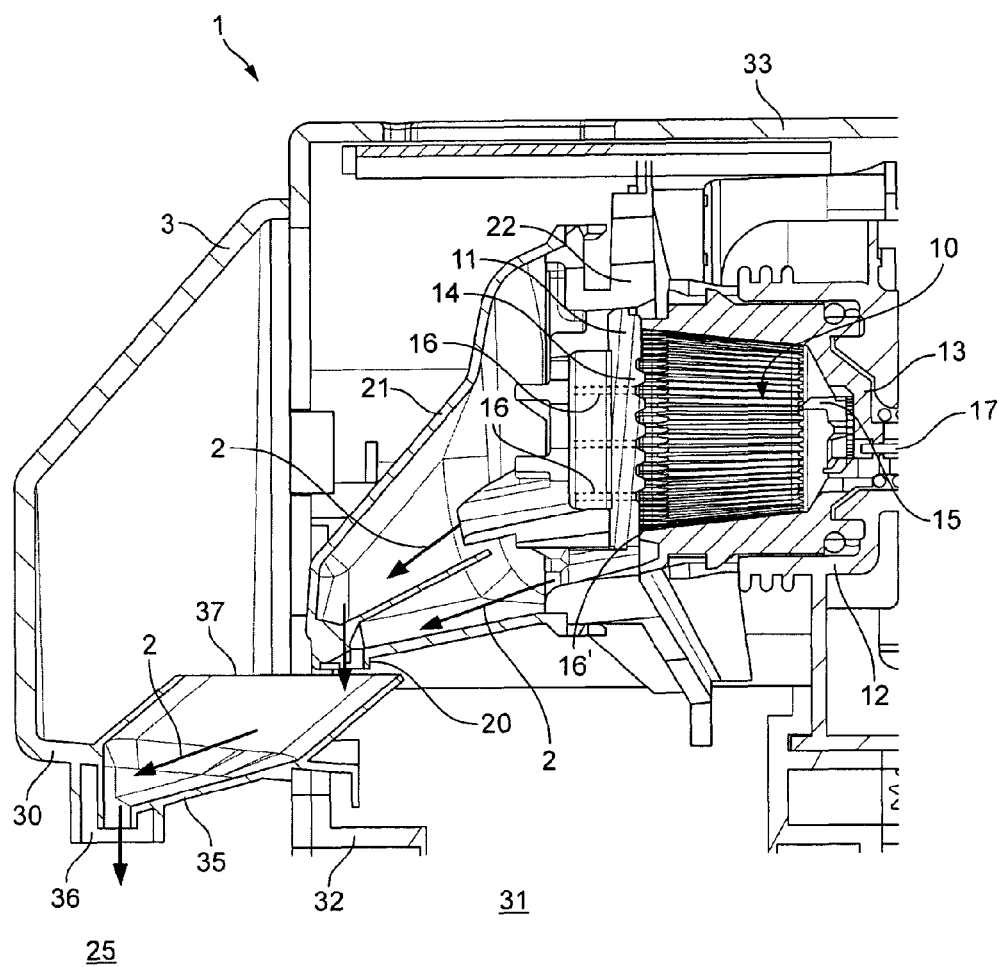
Figure 2:
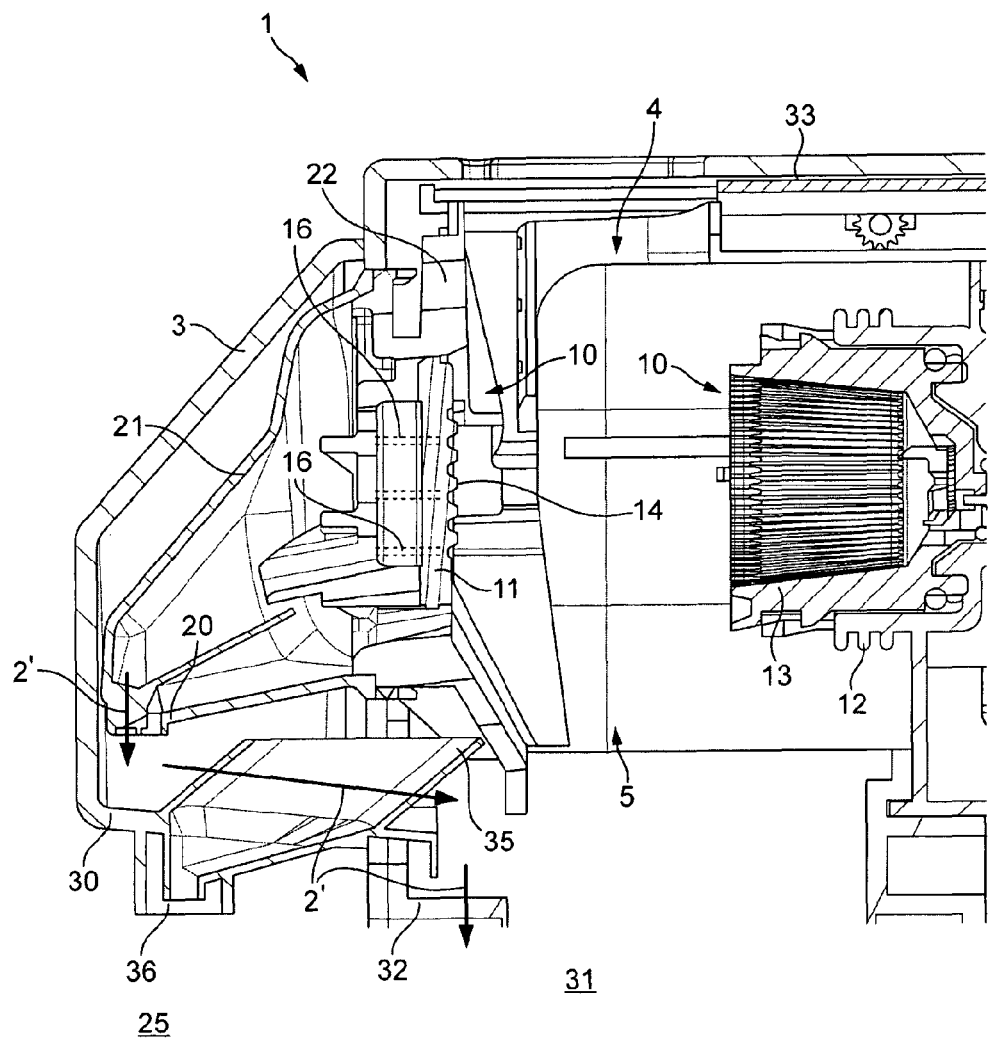

FIGS. 1 and 2 illustrate part of an embodiment of a beverage machine 1 according to the present invention. For instance, the machine is a machine for preparing and dispensing tea and/or coffee.

Machine 1 has a beverage preparation module with an internal circuit for circulating liquid from a reservoir. The module is covered by a housing 3,32,33. The beverage preparation module in the housing has a seat 10 arranged for holding a flavouring ingredient, in particular a pre-portioned ingredient such as an ingredient supplied to such module within a capsule, and circulating a liquid therethrough to form a beverage 2. Examples of such modules are disclosed in WO 2009/074550 and in WO 2009/130099, the teachings of which are hereby incorporated by way of reference.

Hence, the liquid, e.g. water, may be stored in a reservoir and supplied to the beverage preparation module from such reservoir through seat 10. Further details on this type of reservoirs are for example disclosed in EP 10163637.1.

Beverage 2, upon formation, is dispensed via an outlet 20 to a dispensing zone 25, e.g. delimited at the bottom by a support surface for holding a user cup or mug. Such support surfaces are well known in the art, e.g. as disclosed in EP 1 867 260 and WO 2009/074557.

Machine 1 has a collector reservoir 31 for collecting used ingredients, such as tea leaves or ground coffee, e.g. within used capsules, and waste liquid. Collector reservoir 31, e.g. waste collector, may be located in a lower part 32 of housing 3 of machine 1 and have an upper compartment for solids and a lower compartment for liquids. Collector reservoir 31 may be insertable, e.g. slidable, into a cavity formed in machine 1 and removable therefrom for servicing, e.g. emptying the solids and/or liquids contained therein. For example, the storage capacity of collector reservoir 31 for accumulating used ingredient may be aligned to the storage capacity of reservoir for the supply of liquid such as water, e.g. as taught in PCT/EP10/056194.

Collector reservoir 31 is positioned underneath the beverage preparation seat 10 to collect upon beverage preparation the used flavouring ingredient, e.g. ground coffee or tea, evacuated to reservoir 31 via an evacuation passage 5, e.g. by gravity. Reservoir 31 typically has an anti-clogging arrangement, as for example taught in WO 2009/074559 and in WO 2009/135869, which are hereby incorporated by way of reference.

Machine 1 may have a handle (not shown) movable between: a transfer position (FIG. 2) for loading via a passage 4 the flavouring ingredient, e.g. within a capsule, into seat 10; and a processing position (FIG. 1) for circulating the liquid into seat 10 via liquid conduit 17 into the ingredient. Passage 4 may extend from an upper part 33 of housing 3 to seat 10.

To go from the transfer position to the processing position and/or vice versa, seat 10 may be manually actuated via such handle and/or automatically actuated, e.g. motorised and/or hydraulically actuated.

When closed ingredient capsules are used, seat 10 may include a capsule opener such as blades 15 and/or a tearing tool, e.g. a plate with a tearing profile 14.

Seat 10 has a first part 11 that is movable between: the transfer position for introducing a beverage ingredient, e.g. a flavouring ingredient such as ground coffee or tea, into the seat and/or for removing the ingredient therefrom; and the processing position for forming beverage 2 from the ingredient in the seat, in particular by circulating water.

Furthermore, machine 1 has a drop collector 30 for collecting drops 2' from beverage outlet 20.

In accordance with the invention, movable part 11 of seat 10, outlet 20 and drop collector 30 are associated, in particular connected, so that drop collector 30 and outlet 20 are relatively moved into:

a drop collection configuration (FIG. 2) for the drop collector 30 to collect drops 2' from outlet 20 when movable part 11 of seat 10 is in the transfer position; and/or a dispensing configuration (FIG. 1) for dispensing the formed beverage 2 from outlet 20 into a dispensing zone 25, in particular a zone arranged for receiving a recipient such as a cup or a mug, when movable part 11 of seat 10 is in the processing position.

Seat 10 may include two relatively movable parts 11,12 to form an ingredient chamber in the processing position, such as a brewing unit, of the beverage preparation module. These parts 11,12 are relatively movable from: the transfer position for insertion of the flavouring ingredient into the chamber and/or evacuation of this ingredient therefrom; and a processing position for circulating the liquid through this ingredient in the chamber of seat 10 to form beverage 2. Relatively movable parts 11,12 can be manually and/or automatically movable apart for opening the seat 10 into the transfer position and moved together for closing seat 10 into the processing position. In the processing position, seat 10 may tightly enclose the ingredient, typically a solid ingredient such as ground coffee, tea leaves or milk powder, to ensure proper guidance of the liquid through the ingredient. Examples of suitable brewing unit configurations are for example disclosed in EP 1 646 305, EP 1 859 713, EP 1 859 714 and WO 2009/043630.

Figure 3:
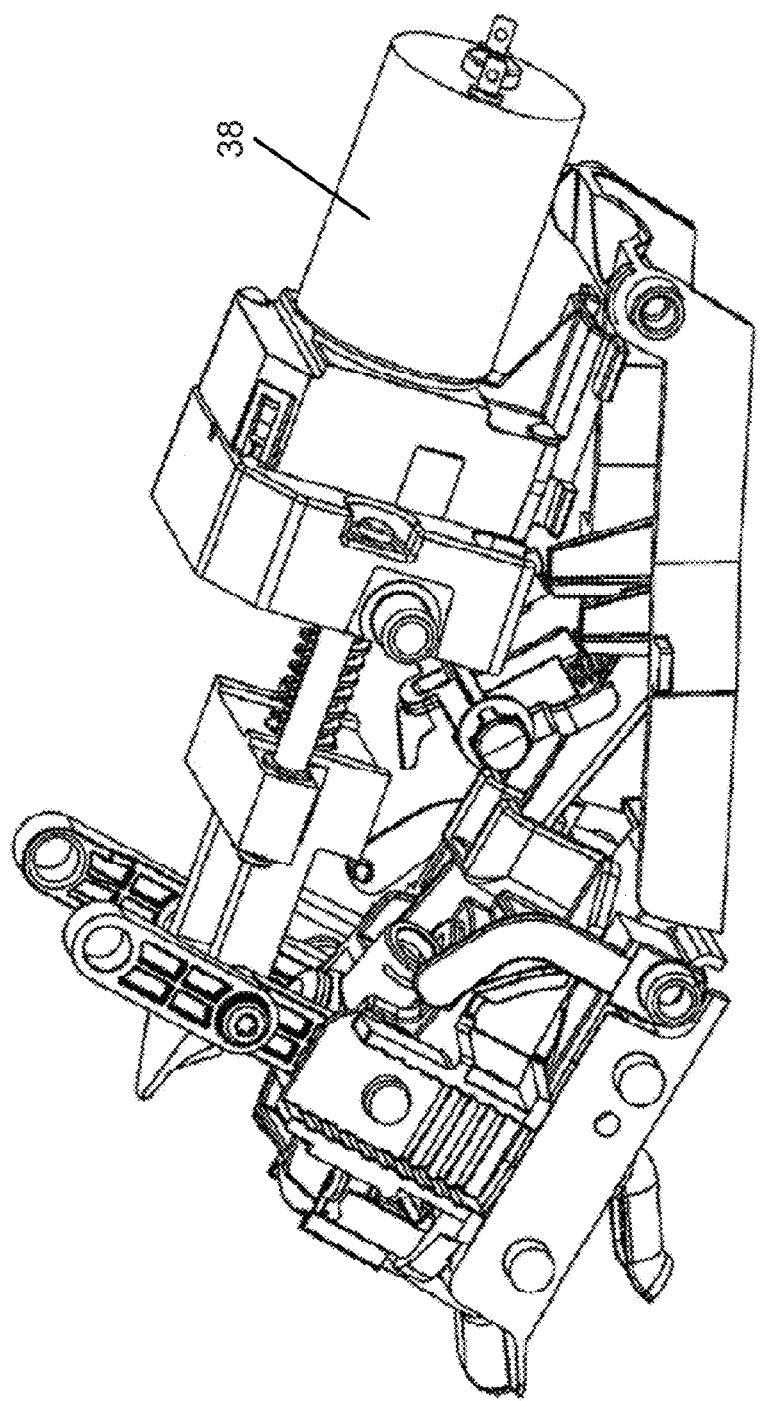
FIG. 3 shows an extraction module for a beverage production device in U.S. Pat. No. 8,272,319 (incorporated herein by reference), showing an example of the actuator (e.g., motor) 38.

For instance, an automatic actuator 38 (FIG. 3) for moving movable part 11 of the seat 10 may be controlled to move part 11 from the processing position to the transfer position automatically at the end of a beverage formation, whereby outlet 20 and drop collector 30 are automatically moved into the drop collection configuration (FIG. 2).

Moreover, part 12 of seat 10 may include a piston chamber for holding a generally tubular piston member 13 that may be urged hydraulically against part 11 to adjust closure of part 11 against part 12,13.

Machine 1 typically includes one or more of the following components:

a) seat 10, e.g. a brewing unit, delimiting in the processing position an inner ingredient chamber for receiving an ingredient of beverage 2 such as a flavouring ingredient, in particular a pre-portioned ingredient supplied within a capsule, and for guiding an incoming flow of liquid via inlet 17, such as water, through this ingredient to beverage outlet 20 via downstream passages 16 in part 11 and/or passages 16' between part 11 and part 12,13;

b) an in-line heater (not shown), such as a thermoblock, for heating this flow of liquid to be supplied to the ingredient holder;

c) a pump (not shown) for pumping liquid through the in-line heater to inlet 17 of seat 10;

d) one or more fluid connecting members (not shown) for guiding liquid from a source of liquid, such as tank of liquid, to seat 10;

e) an electric control unit (not shown), in particular comprising a printed circuit board (PCB), for receiving instructions from a user via an interface and for controlling the in-line heater and the pump; and f) one or more electric sensors (not shown) for sensing at least one operational characteristic selected from characteristics of seat 10, the in-line heater, the pump, liquid tank, ingredient collector 31, a flow of liquid, a pressure of liquid and a temperature of liquid, and for communicating such characteristic(s) to the control unit.

The heater may be a thermoblock or an on demand heater (ODH), for instance an ODH type disclosed in EP 1 253 844, EP 1 380 243 and EP 1 809 151. Examples of suitable brewing units and capsule management are for example disclosed in WO 2005/004683, WO2007/135136 and WO 2009/043630, which are hereby incorporated by way of reference. Suitable beverage preparation modules are for instance disclosed in WO 2009/074550 and WO 2009/130099, which are hereby incorporated by way of reference.

In the particular embodiment shown in FIGS. 1 and 2, movable part 11 of seat 10 is mechanically fixed to outlet 20. Outlet 20 has a generally funnel-shaped body 21 with a mouth 22 that is mechanically secured to movable part 11. Alternatively, the movable part 11 could be integral with such an outlet. In either case, outlet 20 is movable with part 11 relative to drop collector 30.

Machine 1 includes a beverage guide 35 for guiding in the dispensing configuration (FIG. 1) beverage 2 from outlet 20 onto dispensing zone 25 via opening 36. Beverage guide 35 may be movable relative to outlet 20 between a rest position (FIG. 2) and a reception position (FIG. 1) for receiving beverage 2 from outlet 20 and guiding beverage 2 onto dispensing zone 25.

Beverage guide 35 can be fixed to drop collector 30 or integral therewith, e.g. formed of the same component 3 which may also form the outermost housing of machine 1. As illustrated in FIGS. 1 and 2, beverage guide 35 is funnel-shaped and extends through drop collector 30 so that liquid 2' collected from outlet 20 (FIG. 2) on drop collector 30 drains around beverage guide 35 into collector reservoir 31. Conversely, when outlet 20 is located above mouth 37 of guide 35 (FIG. 1), liquid 2 dispensed from outlet 20 is drained along guide 35 through opening 36 onto dispensing zone 25.

Outlet 20 can be relatively movable between drop collector 30 and the beverage guide 35 for draining liquid from outlet 20 into drop collector 30 and the beverage guide, respectively.

The invention claimed is:

1. A machine for preparing a beverage, the machine comprising:
   a seat having at least one movable part configured to move between a transfer position for introducing a beverage ingredient into the seat and/or removing the beverage ingredient therefrom, and a processing position for forming the beverage from the beverage ingredient in the seat;
   an actuator configured to move the at least one movable part of the seat between the processing position and the transfer position;
   an outlet configured to dispense the beverage upon formation in the seat; and
   a drop collector configured to collect drops from the outlet, the drop collector is stationary in the machine, the at least one movable part of the seat, the outlet and the drop collector are configured such that the outlet is movable with the at least one movable part relative to the drop collector between (i) a drop collection configuration for the drop collector to collect drops from the outlet when the at least one movable part of the seat is moved into the transfer position and (ii) a dispensing configuration for dispensing the beverage from the outlet into a dispensing zone when the at least one movable part of the seat is moved into the processing position.

2. The machine of claim 1, wherein the at least one movable part of the seat is mechanically fixed to the outlet or integral therewith.

3. The machine of claim 1, comprising a beverage guide configured to guide in the dispensing configuration the beverage from the outlet onto the dispensing zone.

4. The machine of claim 3, wherein the beverage guide is configured to move relative to the outlet between a rest configuration and a reception configuration for receiving the beverage from the outlet and guiding the beverage onto the dispensing zone.

5. The machine of claim 3, wherein the beverage guide is fixed to the drop collector or integral therewith.

6. The machine of claim 3, wherein the outlet is configured to relatively move between the drop collector and the beverage guide for draining the beverage from the outlet into the drop collector and the beverage guide, respectively.

7. The machine of claim 1, further comprising a waste collector, the drop collector being arranged for evacuating the beverage therefrom into the waste collector.

8. The machine of claim 1, further comprising a housing, the housing is an outermost housing, the drop collector being fixed to the housing, and the at least one movable part of the seat and the outlet move together relative to the drop collector and the housing.

9. The machine of claim 8, wherein the housing is configured to cover the seat in the processing position.

10. The machine of claim 1, wherein the seat comprises a further part cooperating with the movable part for forming therewith an ingredient chamber in the processing position.

11. The machine of claim 1, wherein the seat is configured to house a capsule containing the beverage ingredient.

12. The machine of claim 11, wherein the seat has at least one capsule opener.

13. The machine of claim 1, wherein the at least one movable part of the seat defines one or more passages for the beverage to flow from the seat to the outlet.

14. The machine of claim 1, wherein the actuator is configured to move the at least one movable part of the seat from the processing position to the transfer position automatically at the end of a beverage formation.

15. The machine of claim 3, wherein the beverage guide extends through a lower part of a housing comprising the drop collector and terminates in an opening on a bottom surface of the drop collector.

16. The machine of claim 10, wherein the dispensing configuration positions the outlet in vertical alignment with a beverage guide, and the drop collection configuration positions the outlet at a greater distance from the further part relative to the dispensing configuration.

17. A machine for preparing a beverage, the machine comprising:
   a seat having at least one movable part configured to move between a transfer position for introducing a beverage ingredient into the seat and/or removing the beverage ingredient therefrom, and a processing position for forming the beverage from the beverage ingredient in the seat, the seat comprising a further part cooperating with the at least one movable part for forming therewith an ingredient chamber in the processing position, and the further part of the seat comprising a hydraulic sealing piston for sealing the further part against the at least one movable part;
   an actuator configured to move the at least one movable part of the seat between the processing position and the transfer position;
   an outlet configured to dispense the beverage upon formation in the seat; and
   a drop collector configured to collect drops from the outlet, the drop collector is stationary in the machine, the at least one movable part of the seat, the outlet and the drop collector are configured such that the outlet is movable with the at least one movable part relative to the drop collector into a configuration selected from the group consisting of:
   a drop collection configuration for the drop collector to collect drops from the outlet when the at least one movable part of the seat is moved into the transfer position, and
   a dispensing configuration for dispensing the beverage from the outlet into a dispensing zone when the at least one movable part of the seat is moved into the processing position.

18. The machine of claim 17, comprising a beverage guide extending through a lower part of an outermost housing comprising the drop collector and terminating in an opening on a bottom surface of the drop collector.

19. The machine of claim 17, wherein the dispensing configuration positions the outlet in vertical alignment with a beverage guide, and the drop collection configuration positions the outlet at a greater distance from the further part relative to the dispensing configuration.

* * * * *